Dec. 23, 1958  A. M. CASABONA  2,866,157
TIME SPACING MEASURING APPARATUS
Filed Aug. 24, 1954  2 Sheets-Sheet 1

INVENTOR
ANTHONY M. CASABONA
BY Ernest Fanwick
ATTORNEY

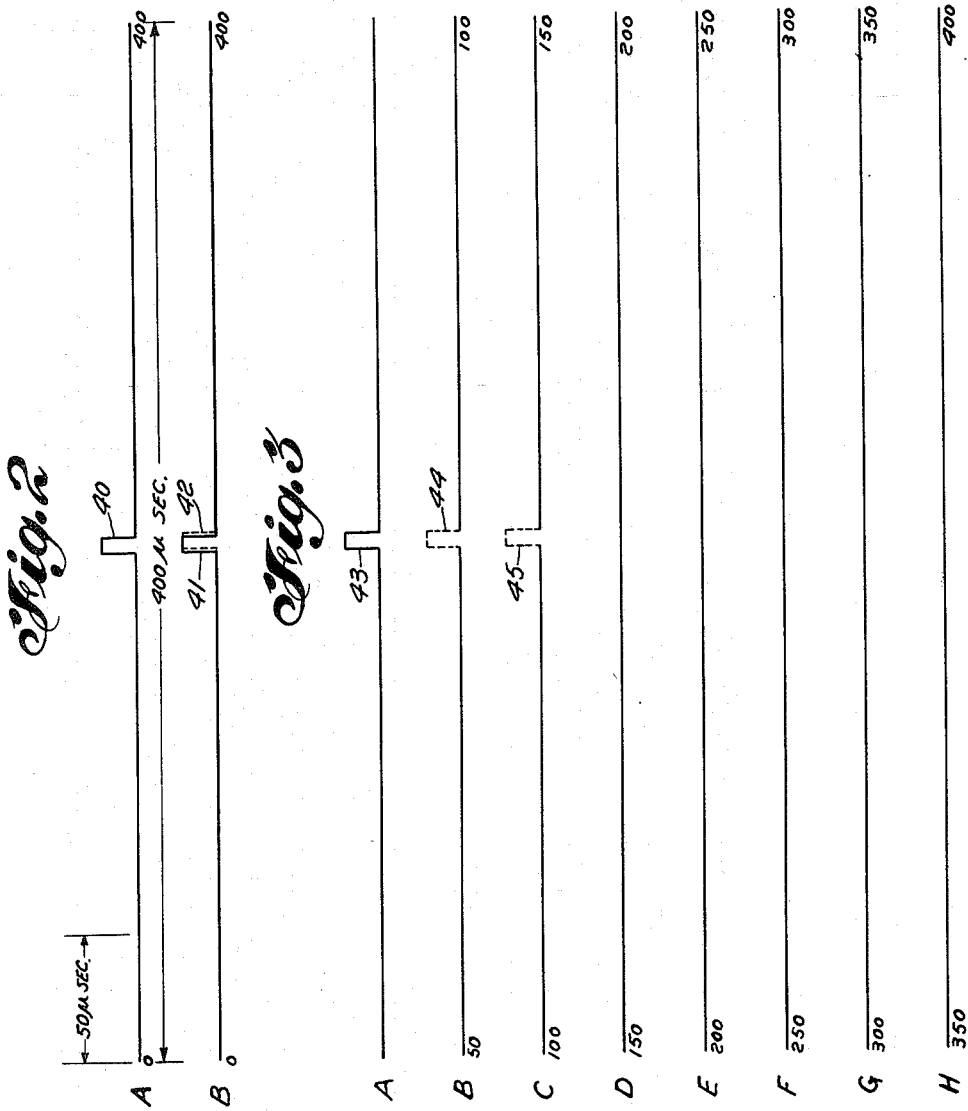

United States Patent Office 2,866,157
Patented Dec. 23, 1958

2,866,157

TIME SPACING MEASURING APPARATUS

Anthony M. Casabona, North White Plains, N. Y., assignor to International Telephone and Telegraph Corporation, Nutley, N. J., a corporation of Maryland Application August 24, 1954, Serial No. 451,742

15 Claims. (Cl. 324—68)

This invention relates to apparatus for measuring the time spacing between successive pulses of a pulse train and more particularly this apparatus provides means for accurately determining the time delay imposed upon a pulse signal by a circuit of unknown time delay characteristics.

In many instances, modern communication systems require that a train of pulses be generated having a very accurate time spacing between adjacent pulses. For example, in the transponder portion of one type of pulsed distance measuring equipment system the ground beacon receiver detects a pulse emitted by a cooperating mobile vehicle and then retransmits a reply pulse after a given predetermined time delay. The predetermined time delay is subtracted in the mobile receiver equipment and the measured distance is determined solely by the time elapse of the transmitted and received pulses. If the distance measurement is to be accurate, the transponder time delay must be extremely precise so that the proper time subtraction may occur at the receiver equipment and means must be provided at the ground beacon for measuring the accuracy of the imposed time delay.

In other types of pulse modulation systems a train of pulses must be generated in which the time spacing between adjacent pulses is accurate to better than .2 of a microsecond. In practice it has been extremely difficult to measure or monitor such a small space of time. The use of oscilloscopes has greatly aided in the making of such small time measurements, but in order to increase the accuracy of an oscilloscope measurement, it has been necessary to utilize an expanded time base scale. Usually such expanded time base scales have required complex circuitry to develop the horizontal deflection voltages for the oscilloscope. As the complexity of the associated equipment is increased, the cost of the measuring apparatus is increased and usually the time necessary to make the measurement is increased.

One of the objects of this invention, therefore, is to provide apparatus suitable for accurately measuring time spacings between successive pulses in a pulse train.

It is another object of this invention to provide apparatus suitable for measuring time delay deviations from a given norm imposed upon a signal by a known circuit.

A further object of this invention is to provide time spacing measuring apparatus utilizing a single frequency source from which all necessary waveforms for use as deflection voltages are developed.

One of the features of the time spacing measuring apparatus of this invention for determining the time delay imposed upon a pulse by a circuit of unknown time delay characteristics is the provision for a source of signals having a known period and dividing the frequency output of the source in order to develop a horizontal sweep voltage for an oscilloscope. Trigger pulses are developed responsive to the source of signals and thus have a period coherent with the horizontal sweep voltage period. The pulses are coupled through the unknown time delay circuit and then combined with undelayed pulses and coupled to the vertical deflection means of the oscilloscope. If the time delay of the circuit is related to the period of the source of signals then the pulses appearing on the oscilloscope will be coincident or if the pulses are not coincident on the screen of the oscilloscope the frequency of the source of signals can be varied until the pulses are coincident.

Another feature of this invention is the use of the time spacing measuring apparatus as a monitor to assure that the delay imposed by a circuit having predetermined delay characteristics is accurate. A stable crystal oscillator having a frequency whose period is a multiple of the given time delay is used as the frequency source responsive to which a train of pulses is produced. Coincidently and with exact coherence a sawtooth horizontal sweep voltage is generated. Due to the coherence if the pulses are applied to vertical deflection means they remain stationary. In addition if the pulses are delayed by an amount of time equal to the horizontal sweep then the delayed pulses will be coincident with the undelayed pulses.

The above-mentioned and other features and objects of this invention will become more apparent by reference to the following description taken in conjunction with the accompanying drawings, in which:

Figure 1 of the drawing is a schematic diagram in block form of one embodiment of the spacing measuring apparatus of my invention; and Figures 2 and 3 are sets of curves helpful in the explanation of my invention.

Referring to Figure 1 of the drawing, one embodiment of the time spacing measuring apparatus in accordance with the principles of my invention is seen to comprise a frequency source 1 whose output is coupled to a shaper 2 and divider circuit 3. Simultaneously, the sub-multiple frequency from divider circuit 3 is differentiated and amplified in circuit 7 and triggers a sawtooth generator 8 whose output is coupled through cathode follower circuit 9 and switch 10 to the horizontal deflection means 11 to provide a horizontal sweep for the cathode ray in the cathode ray tube oscilloscope 12. The cathode ray tube oscilloscope 12 comprises the usual cathode ray tube 13 having an electron gun and focusing means 14 as well as horizontal deflection means 11 and vertical deflection means 25. Simultaneously, the output of the divider circuit 3 is coupled to a second divider circuit 4 to produce a frequency which is a sub-multiple of both the output of divider circuit 3 and of the frequency of the output of frequency source 1. The sub-divided frequency from divider circuit 4 is differentiated and amplified in circuit 5 and triggers a pulse signal generator 6. The output of the pulse signal generator 6 is coherent with the output of frequency source 1.

The pulsed output of signal generator 6 is coupled to circuit 20 which comprises the circuit under test having unknown time delay characteristics or a monitored circuit having known time delay characteristics which are to be checked. The delayed pulse output from circuit 20 is coupled through diode detector 21 to a mixer 22 whose other input comprises the undelayed pulses from generator 6 coupled through diode detector 23. The common output of the mixer circuit 22 is coupled through switch 24 to the vertical deflection circuit 25 of the cathode ray tube 13 in the oscilloscope 12.

For purposes of explanation, let it first be assumed that it is desired to monitor the time delay imposed upon a pulse signal by a circuit whose time delay is to be a constant. The circuit whose time delay is to be monitored is represented by the test circuit 20. It is one function of the apparatus of my invention to supply a train of pulses to the circuit 20 under test and a horizontal sweep voltage to the oscilloscope 12 which are precisely coherent with each other. This precise coherence is accomplished by utilizing a crystal oscillator 30 as the single frequency source. For purposes of explanation, let it be assumed that the circuit 20 under test must provide a 50 microsecond time delay with an accuracy of ±.2 of a microsecond. Although basically lower frequencies are required, the crystal oscillator 30 provides a frequency of 80 kilocycles since this is a frequency for which dependable crystals can be readily obtained. Obviously, the output of the 80 kc. frequency source has a period equal to 12.5 microseconds. When utilizing the crystal oscillator 30, the switch 31 has its armature placed in the "A" position and the output of the crystal oscillator 30 is coupled to the shaper and amplifier circuit 2 in order to improve its rise time. The output of the shaper amplifier circuit 2 is coupled to a divider circuit 3 which divides the frequency of the crystal oscillator by a factor of 4 and thus in the assumed example wherein the crystal oscillator was 80 kilocycles the output of the divider circuit 3 would be 20 kilocycles or in other words have a period equal to 50 microseconds, the time delay which circuit 20 must impose upon its input signal if it is operating correctly. The 20 kilocycle output of divider 3 is fed into a differentiator and amplifying circuit 7 whose output is used to trigger the sawtooth generator 8 whose output is a sawtooth wave at a 20 kilocycle rate having a 50 microsecond period. The 20 kilocycle sawtooth wave is coupled through cathode follower circuit 9 and the armature of switch 10 placed in the "A" position, or through pulse counter and suppressor circuit 46, whose purpose will be explained hereinafter, to control the horizontal deflection circuits of the cathode ray tube 13. Thus the cathode ray of the oscilloscope 12 will be deflected across the face of tube 13 once every 50 microseconds.

The output of the divider circuit 3 is also coupled to an additional divider circuit 4 to divide the 20 kc. output by eight and produce an output frequency of 2500 cycles having a period of 400 microseconds. The 2500 cycle signal is differentiated and amplified in circuit 5 and used to trigger a pulse signal generator 6. One output of the pulse signal generator 6 having a frequency of 2500 pulses per second is used to trigger the circuit 20 under test. The output of the circuit 20 under test will be a train of pulses time delayed by the amount of the time delay imposed by circuit 20. It was assumed that this time delay is desired to be precisely 50 microseconds. The output of signal generator 6 is also coupled directly to a diode detector 23 while the delayed pulsed output 20 is coupled to diode detector 21. The output of the diode detector circuits 21 and 23 are coupled to a mixer 22. Therefore at the common output line of mixer 22 there appear every 400 microseconds two pulses exactly 50 microseconds apart if the time delay of circuit 20 is exactly 50 microseconds. Switch 47 and meter 48 are utilized to make certain that both detectors 21 and 23 are receiving pulses of substantially equal amplitudes. The common output line of mixer 22 is coupled through armature of switch 24, in the "A" position to the vertical deflection means of the cathode ray tube 13. The sawtooth wave generated by sawtooth generator 8 is used to horizontally sweep the cathode ray of the oscilloscope. The delayed pulse from diode detector 21 and the reference pulse from diode detector 23, both passed through mixer 22 are viewed simultaneously on the oscilloscope. If the delay imposed by circuit 20 is exactly 50 microseconds then the delayed pulse will be at exactly the same point on each successive line sweep since the horizontal sweep has a period which is equal to the 50 microsecond time delay. If enough sweep amplitude is present a .2 of a microsecond difference in superposition between the delayed and undelayed pulse can be easily seen.

Since the sawtooth generator 8 generates a signal at a 20 kilocycle rate and has a period of 50 microseconds one horizontal sweep of the cathode ray beam will occur each 50 microseconds. Since it is desired to measure the accuracy of a 50 microsecond delay imposed by circuit 20, it is obvious that if this delay is accurate, then successive pulses on the common output line from mixer 22 will be coincident when displayed on the oscilloscope since they will be separated by a 50 microsecond time delay and it is apparent that any deviation in the desired time delay imposed by circuit 20 is visually identified by the non-coincidence of the pulses displayed on the face of the cathode ray tube 13.

Referring to Figure 2 of the drawing, curve A is a representation of the trace appearing on the face of the oscilloscope 12 during a 400 microsecond interval when the delay imposed by the circuit under test is exactly 50 microseconds. It is seen that the pulses 40 are stationary and superimposed. If the delay imposed by the circuit under test should vary from the desired 50 microseconds, the undelayed and delayed pulse output of mixer 22 will not be superimposed on the face of the oscilloscope 12 and the trace may appear as shown in Fig. 2, curve B, where the undelayed pulse 41 is seen not to be coincident with the delayed pulse 42. If the time delay of circuit 20 should vary by as little as .2 of a microsecond it is visually apparent on the face of the cathode ray tube 13.

Referring to Figure 3, curves A through H represent eight successive horizontal sweeps of the cathode ray of oscilloscope 12, each sweep having a period of 50 microseconds. The undelayed pulse 43 will appear during the first sweep and 50 microseconds later the delayed pulse 44 should appear. In most applications circuit 20 will not vary appreciably from the desired 50 microsecond time delay, however, if the circuit 20 should impose a delay which is a multiple of 50 microseconds, such as 100 microseconds represented by pulse 45, the pulses displayed on the oscilloscope would be superimposed and the error in the time delay would not be detected. To prevent such undetected errors from occurring the armature of switch 10 is depressed to the "B" position and the horizontal sweep voltages are coupled to a timing and suppressing circuit 46 which eliminates all horizontal sweeps except the desired one from being displayed on the face of the tube. As the circuit 46 is varied each horizontal trace (as shown in Fig. 3) is separately displayed on the oscilloscope 12 and it is easy for the operator to make sure that two successive sweeps have pulses contained within them and thus eliminate any possibility of the time delay being a multiple of the desired 50 microseconds.

Referring again to Figure 1 of the drawing, it is seen that when the armature of switch 24 is moved from the "A" to the "B" position the common output of the mixer 22 is coupled to the "Z" or intensity input 15 of the oscilloscope 12. Thus on the face of the cathode ray tube 13 the output of mixer 22 will appear as bright spots rather than pulses and the coincidence of the spots is indicative of the imposition of the desired time delay by circuit 20.

If desired switch 34 can be closed and the undelayed pulse output of generator 6 utilized to trigger a vertical deflection signal generator 35 whose output is coupled to the vertical deflection means of oscilloscope 12 and utilized to produce various other types of cathode ray displays.

The time space measuring apparatus in accordance with the principles of my invention may also be utilized to measure an unknown amount of time delay imposed by a given circuit under test. This is accomplished by moving switch 31 to the "B" position and utilizing a variable oscillator 32 as the single frequency source. A meter 33 is provided, which is extremely accurate, in order to determine the period of the output frequency of the variable oscillator 32. The output of oscillator 32 is coupled as heretofore explained through a shaper amplifier 2 and divider circuit 3 whose output triggers a sawtooth generator 8 after being differentiated and amplified in circuit 7. The sawtooth waveform circuit 8 is coupled through cathode follower 9 to the horizontal sweep circuits of the cathode ray tube 13. A portion of the output of divider circuit 3 is coupled to divider circuit 4 and differentiated and amplified in circuit 5 whose output triggers the pulse signal generator 6. The pulse output of generator 6 is passed through the unknown delay of circuit 20 and coupled to diode detector 21 and the undelayed pulse is coupled to diode detector 23 whose output is mixed in mixer 22 as heretofore explained. The common output of mixer 22 is coupled via switch 24 to the vertical deflection means of the cathode ray tube 13. The variable oscillator 32 is adjusted until the pulses appearing on the face of the cathode ray tube are superimposed and the time delay imposed by circuit 20 will then be four times the period of the output of the variable oscillator 32 if circuit 3 is a divider. Thus, it is apparent that time space measuring apparatus of this invention can be utilized to measure an unknown time delay.

While I have described above the principles of my invention in connection with specific apparatus, it is to be clearly understood that this description is made only by way of example and not as a limitation to the scope of my invention as set forth in the objects thereof and in the accompanying claims.

I claim:

1. Apparatus for determining the unknown time delay of a circuit comprising a source of signals, a cathode ray tube including first and second means to deflect said ray in two mutually perpendicular directions, means responsive to said source of signals to generate sweep voltages each having a given period which is equal to or less than the delay to be measured, means to couple said sweep voltages to said first deflection means, means responsive to said signal source to generate a train of pulses having a time interval which is a multiple of said period, means to couple said pulses to said circuit of unknown time delay, means to combine the time delayed output pulses of said circuit with the undelayed output of said pulse generator means and means responsive to said combined signals to cause a visual indication of said pulses to be displayed on said cathode ray tube.

2. Apparatus according to claim 1 wherein said means responsive to said combined signals to cause a visual indication of said pulses includes means to couple said combined signals to said second deflection means.

3. Apparatus according to claim 1 wherein said means to generate a train of pulses includes means to produce a trigger signal having a period which is a multiple of said period whereby the period of said sweep voltages is a submultiple of the time interval between pulses in said pulse train.

4. Apparatus for determining the unknown time delay of a circuit comprising a source of signals having an adjustable period, a cathode ray tube including first and second means to deflect said ray in mutually perpendicular directions, means responsive to said signals to generate a train of sweep voltages each having a period equal to or less than the delay to be measured, means to couple said sweep voltages to said first deflection means, means responsive to said signal source to generate a train of pulses having a time interval related as a multiple to the period of each of said sweep voltages, means to couple said pulses to said circuit of unknown time delay, means to combine the time delayed output of said circuit with the undelayed output of said pulse generator means, means to couple said combined signals to said second deflection means and means to adjust the period of said signal source to cause the pulses displayed on said cathode ray tube to be coincident whereby said unknown time delay is determined to be equal to or an integral multiple of said period of said sweep voltages.

5. Apparatus for utilizing the known period of a signal having a given frequency to determine the time delay of a circuit comprising in combination a cathode ray tube having an electron gun, anode, cathode and a first and second cathode ray deflecting system, means responsive to said signal coupled to said first deflecting system to sweep said cathode ray at a known uniform rate related to said given frequency across the face of said tube, the sweep period being equal to or less than the time delay to be measured, means for generating pulse test signals responsive to said signals at a given frequency which is a submultiple of said sweep voltage rate, means for passing said pulse signals through said time delay circuit, means for combining the output of said time delayed pulse signals with undelayed pulse signals, means for impressing said combined signals upon said second deflection means to leave a visual indication of the time delay of said circuit on the face of said tube.

6. Apparatus according to claim 5 wherein said means responsive to said signal coupled to said first deflection system includes means to produce a sweep signal having a frequency which is a submultiple of said given frequency and means for producing a sawtooth wave in response to said sweep signal.

7. Apparatus according to claim 6 wherein said means for generating pulse signals includes means for producing a trigger signal at a frequency which is a submultiple of said sweep signal and means responsive to said trigger signal to produce a train of said pulse signals.

8. Apparatus for determining the unknown time delay of a circuit comprising a source of signals having a known period, a cathode ray tube including first and second means to deflect said ray in two mutually perpendicular directions, means to produce a first trigger signal having a period which is a multiple of said known period, means for producing a sawtooth wave in response to said first trigger signal whose period is equal to or less than the delay to be measured, means to couple said sawtooth wave to said first deflection means, means for producing a second trigger signal having a period which is an integral multiple of the period of said sweep signal, means responsive to said second trigger signal to produce a chain of pulse signals having a time interval which is an integral multiple of the period of each sawtooth of said sawtooth wave, means to couple said pulses to said circuit of unknown time delay, means to combine the time delayed output of said circuit with the undelayed output of said pulse generator means, means to couple said combined signals to said second deflection means to cause a visual indication of said pulses to appear on said tube whereby when said delayed and undelayed combined pulses are superimposed on said cathode ray tube face said unknown time delay equals said known period.

9. Apparatus for testing the accuracy of a predetermined time delay imposed by a given circuit comprising a source of signals having a period which is an integral submultiple of said predetermined time delay, a cathode ray tube including first and second means to deflect said ray in two mutually perpendicular directions, means responsive to said signal to generate a sweep voltage whose period is equal to or a submultiple of said predetermined time delay, means to couple said sweep voltage to said first deflection means, means responsive to said signal source to generate a train of pulses having a time interval which is an integral submultiple of said period, means to couple said pulses to said given circuit, means to combine the time delayed output of said circuit with the undelayed output of said pulse generator means, means to couple said combined signals to the second of said deflection means whereby the accuracy of said time delay is proven if the pulses displayed on said cathode ray tube are coincident.

10. Apparatus according to claim 9 wherein said source of signals having a period which is the integral multiple of said predetermined time delay comprises a crystal controlled oscillatory circuit.

11. Apparatus for testing the accuracy of a predetermined time delay imposed by a given circuit comprising a crystal oscillator source of signals having a period which is an integral multiple of said predetermined time delay, a cathode ray tube including first and second means to deflect said ray in two mutually perpendicular directions, means responsive to said signals to generate an alternating voltage having a period which is an integral multiple of the period of said crystal oscillator signals, means responsive to said alternating voltage for producing a sawtooth wave sweep voltage having a period which is equal to or a submultiple of said predetermined time delay, means to couple said sweep voltage to said first deflection means, means responsive to said alternating voltage to produce a trigger signal having a period which is an integral multiple of the period of said alternating voltage, means responsive to said trigger signal to produce a train of pulse signals, means to couple said pulses to said given circuit, means to combine the time delayed output of said circuit with the undelayed output of said pulse generator means, means to couple said combined signals to said cathode ray tube to produce a visual indication of said pulses whereby the accuracy of said time delay is proven if the pulses displayed on said cathode ray tube are superimposed.

12. Apparatus according to claim 11 which further includes means to suppress a recurring portion of the voltage coupled to said first deflection means in order to blank out portions of the visual cathode ray trace.

13. Apparatus according to claim 11 wherein said cathode ray tube further includes means to intensity modulate the cathode ray and said combined signals are coupled to said intensity modulation means.

14. Apparatus according to claim 11 wherein said means to produce a visual indication include means to couple said combined signals to said second deflection means of said cathode ray tube.

15. Apparatus according to claim 14 wherein said means to couple said combined signals further includes a deflection signal generator responsive to said combined signals and means to couple the output of said deflection signal generator to said second deflection means.

References Cited in the file of this patent

UNITED STATES PATENTS

| | | |
|---|---|---|
| 2,470,464 | Bowie | May 17, 1949 |
| 2,604,622 | Hasbrook | July 22, 1952 |
| 2,621,238 | Palmer | Dec. 9, 1952 |